July 17, 1962 F. R. J. DUHAMEL 3,044,315
V-BELT TENSIONING AND CLUTCH STRUCTURE
Filed Feb. 12, 1960 2 Sheets-Sheet 1

INVENTOR.
FRANCIS R. J. DUHAMEL
BY D. Emmett Thompson
Attorney

INVENTOR.
FRANCIS R. J. DUHAMEL 3,044,315
V-BELT TENSIONING AND CLUTCH
STRUCTURE
Francis R. J. Duhamel, Syracuse, N.Y., assignor, by mesne assignments, to Moto-Mower, Inc., Richmond, Ind., a corporation of Delaware
Filed Feb. 12, 1960, Ser. No. 8,412
4 Claims. (Cl. 74—230.17)

This invention relates to a V-belt drive arrangement in the form of a belt tensioning and clutch structure.

The invention has an object a compact structural arrangement which functions to maintain a minimum tension on one belt and provides for clutching and de-clutching a second belt.

The invention consists in the novel features and in the combinations and constructions hereinafter set forth and claimed.

In describing this invention, reference is had to the accompanying drawings in which like characters designate corresponding parts in all the views.

In the drawings—

Figure 1:
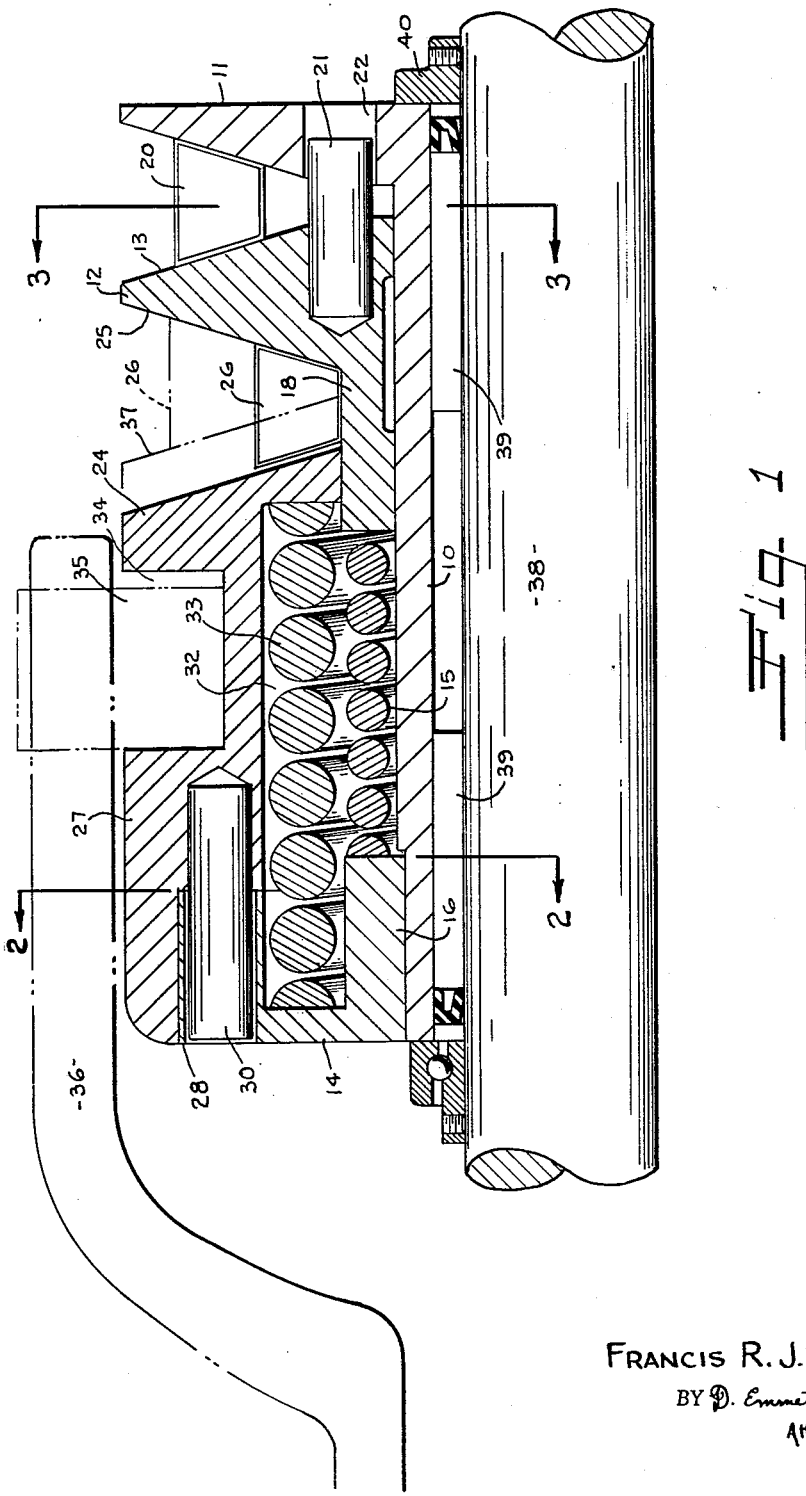
FIGURE 1 is a lengthwise sectional view of an embodiment of the invention.
Figure 2:
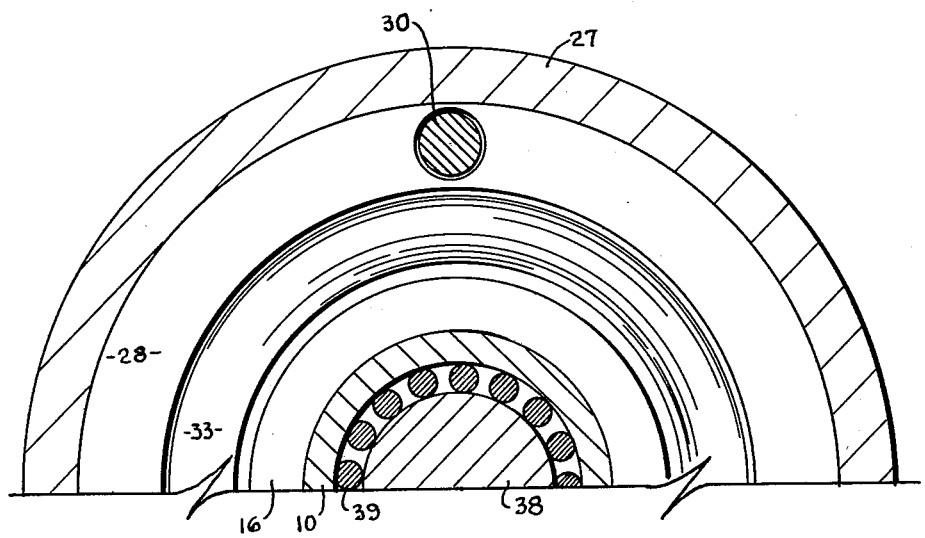
FIGURE 2 is a view taken on line 2—2, FIGURE 1.
Figure 3:
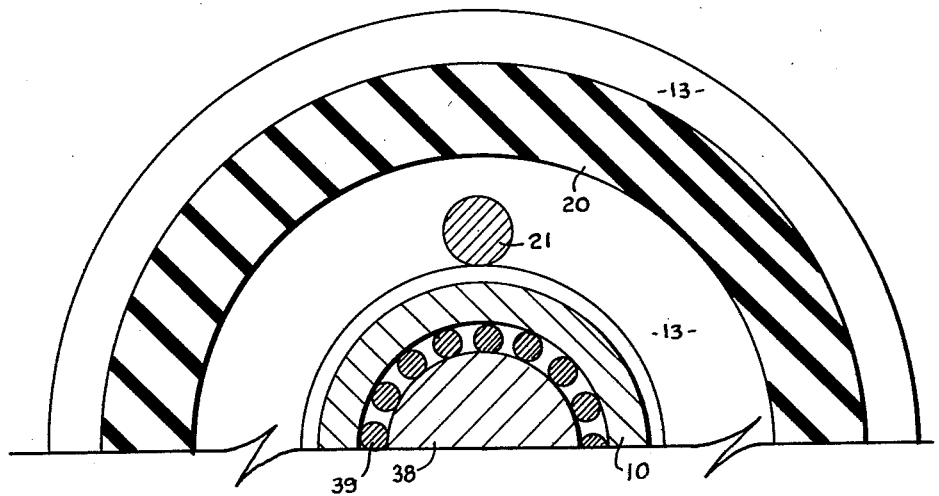
FIGURE 3 is a view taken on line 3—3, FIGURE 1.

The clutch and tensioning structure comprises a sleeve 10 having affixed thereto a belt flange. There is slidably mounted for axial movement a mating belt flange and a spring means for urging the second flange toward the fixed flange to provide a variable pitch V-belt sheave pulley. As shown in FIGURE 1, the belt flange 11 is formed integral with the sleeve 10. The mating flange 12 is slidably mounted upon the sleeve 10 and has an inclined belt engaging surface 13 confronting the flange 11.

A collar 14 is fixedly mounted on the opposite end of the sleeve 10 as, for example, by a press fit. A helical compression spring 15 is interposed between the hub portion 16 of the collar and the cylindrical hub portion 18 of the flange 12. The spring 15 functions to yieldingly urge the flange 12 toward the flange 11 for engagement with a belt 20. Preferably, the flange 12 is keyed to the sleeve 10 for rotation therewith. This keyed connection may take the form of a pin 21 mounted in the flange 12 and extending into an aperture 22 formed in the flange 11.

A third belt flange 24 is mounted for axial movement toward and from the inclined belt engaging surface 25 of the flange 12 and forms, in conjunction therewith, a second V-belt sheave pulley for the reception of a second belt 26. The flange 24 is slidably mounted upon the hub portion 18 of the flange 12 and has a cylindrical portion 27 of appreciable length. This cylindrical portion 27 is formed at the end opposite to the flange 12 with a counterbore for slidable coaction on the periphery of an annular portion 28 of the fixed collar 14. It is also preferable that the flange 24 rotates in unison with the flanges 11 and 12 and to this end, a pin 30 is fixedly mounted in the cylindrical portion 27 of flange 24 and is slidably mounted in an aperture formed in the portion 28 of the fixed collar 14.

The bore of the cylindrical portion 27 of flange 24 is spaced circumferentially outwardly from the collar hub 16 and the hub 18 of flange 12 to provide a space 32 in which a helical compression spring 33 is mounted, this spring acting at one end against the fixed collar 14 and at its opposite end against the belt flange 24 to urge that flange into clutching or driving engagement with the belt 26 and the belt into engagement with the surface 25 of flange 12.

The cylindrical portion 27 of flange 24 is formed with a circumferential groove 34 for the reception of a shifting yoke 35 carried by a suitable actuating arm 36. With this arrangement, the flange 24 may be shifted against the action of spring 33 out of clutching engagement with the belt 26, as shown in full line, FIGURE 1. When the flange 24 is released by the shifting mechanism, it is moved toward the flange 12, as indicated by the dotted line position 37, FIGURE 1.

The sleeve 10 is rotatably journalled on a fixed shaft or stud 38 and preferably, anti-friction bearings 39 are positioned between the sleeve 10 and the supporting stud 38. The assembly may be restrained against axial movement on the supporting stud by collars 40.

The spring 15, acting upon the flange 12, maintains a minimum tension on the belt 20, which may be a driven belt. The spring 33, acting on the flange 24, effects clutching engagement with the belt 26, which may be a driving belt and also, because of the variable pitch sheave arrangement, maintains tension on the belt 26.

What I claim is:

1. A V-belt tensioning and clutch structure comprising a sleeve having a belt flange at one end, a second belt flange slidably mounted on said sleeve in confronting relation to said first flange for axial movement toward and from the same, spring means urging said second flange toward said first flange, whereby said flanges form a variable pitch V-belt pulley, a third flange mounted for axial movement toward and from said second flange, other spring means urging said third flange toward said second flange for driving engagement with a V-belt positioned between said second and third flanges, said third flange having a hub portion encircling both of said springs, said third flange being shiftable against the action of said other spring in a direction away from said second flange and out of engagement with said belt.

2. A V-belt tensioning and clutch structure comprising a sleeve having a fixed belt flange at one end, a second belt flange slidably mounted on said sleeve in confronting relation to said first flange for axial movement toward and from the same, whereby said flanges form a variable pitch V-belt pulley, a third flange mounted for axial movement toward and from said second flange, spring means urging said third flange toward said second flange for driving engagement with a V-belt positioned between said second and third flanges, said third flange being formed with a cylindrical portion enclosing said spring means, said third flange being shiftable against the action of said spring in a direction away from said second flange and out of engagement with said belt, and a second spring means urging said second flange toward said first flange.

3. A V-belt tensioning and clutch structure comprising a belt flange fixed against axial movement, a second mating belt flange in confronting relation to said first flange and mounted for axial movement toward and from the same, spring means acting on said second flange to move the same axially toward said first fixed flange to form a V-belt pulley of variable pitch, a third flange mounted in confronting relation to said second flange, a second spring means urging said third flange toward said second flange for engagement with a V-belt positioned between said second and third flanges, said third flange being shiftable against the action of said second spring means in a direction away from said second flange and out of engagement with said belt.

4. A V-belt tensioning and clutch structure comprising a belt flange fixed against axial movement, a collar mounted in axial spaced relation to said flange and being fixed against axial movement, a second belt flange positioned intermediate said first flange and said collar and being movable axially toward and from said first flange, a third flange mounted intermediate said collar and said second flange and being shiftable axially independently of said second flange toward and from the same, a compression spring interposed between said collar and said second flange to urge said second flange toward said first flange to form in conjunction therewith a V-belt pulley of variable pitch, a second compression spring interposed between said collar and said third flange to urge the same toward said second flange into engagement with a V-belt positioned between said second and third flanges, and said third flange being shiftable against the action of said second spring in a direction from said second flange out of engagement with said belt.

References Cited in the file of this patent

UNITED STATES PATENTS

| | | |
|---|---|---|
| 2,209,736 | Livingston | July 30, 1940 |
| 2,611,277 | Mitchell | Sept. 23, 1952 |
| 2,741,135 | Numan | Apr. 10, 1956 |
| 2,842,355 | Lange | July 8, 1958 |
| 2,927,480 | Schweickart | Mar. 8, 1960 |

FOREIGN PATENTS

| | | |
|---|---|---|
| 633,789 | Great Britain | Dec. 30, 1949 |